United States Patent [19]  
Elrick et al.

[11] 3,948,698  
[45] Apr. 6, 1976

[54] SOLID PROPELLANT COMPOSITIONS HAVING EPOXY CURED, CARBOXY-TERMINATED RUBBER BINDER

[75] Inventors: Donald E. Elrick, Rawlings; Harry Gilbert, Cumberland, both of Md.

[73] Assignee: Hercules Incorporated, Wilmington, Del.

[22] Filed: Sept. 6, 1967

[21] Appl. No.: 667,623

[52] U.S. Cl. ............ 149/19.6; 149/19.9; 149/19.92
[51] Int. Cl.² ............................................ C06D 5/06
[58] Field of Search ......... 149/19, 19.6, 19.9, 19.92

[56] References Cited
UNITED STATES PATENTS

| | | | |
|---|---|---|---|
| 3,087,843 | 4/1963 | Pritchard | 149/19 |
| 3,087,844 | 4/1963 | Hudson et al. | 149/19 |
| 3,147,161 | 9/1964 | Abere et al. | 149/19 |
| 3,155,552 | 11/1964 | Vriesen | 149/19 |
| 3,214,304 | 10/1964 | Vriesen | 149/19 |
| 3,305,523 | 2/1967 | Burnside | 149/19 X |
| 3,354,116 | 11/1967 | Gruver et al. | 149/19.6 X |
| 3,698,967 | 10/1972 | Thompson et al. | 149/19.9 |

*Primary Examiner*—Benjamin R. Padgett
*Assistant Examiner*—E. A. Miller
*Attorney, Agent, or Firm*—Michael B. Keehan; Hazel L. Deming

[57] ABSTRACT

Solid propellant compositions wherein the polymeric binder is an all-epoxide cured carboxy-terminated rubber are described. A typical composition contains oxidizer, fuel and a binder formed by curing a carboxy-terminated polybutadiene with a specified mixture of a diepoxide and triepoxide using chromium 2-ethylhexanoate as catalyst.

6 Claims, No Drawings

SOLID PROPELLANT COMPOSITIONS HAVING EPOXY CURED, CARBOXY-TERMINATED RUBBER BINDER

This invention relates to solid propellants and, more particularly, to solid propellants having an improved polymeric binder system based on carboxy-terminated rubbers.

Solid propellant formulations containing as binder carboxy-terminated polybutadiene and aziridinyl curing agents alone or in combination with an epoxide curing agent are known. Such systems, however, have many disadvantages, most of which are centered around the aziridinyl curing agent. For example, when such aziridinyl curing agents as carboxamides are used, side reactions such as the formation of oxazolines occur, and when phosphoramides are used, the resulting phosphorus-nitrogen bonds are adversely affected by heat, moisture, and vibration. Substitution of multifunctional epoxides for all or part of the aziridinyl curing agents likewise has not provided useful formulations since the rate of reaction of the epoxide with the carboxy-terminated polybutadiene in the absence of catalysts is too slow to be of value and, in the presence of known catalysts such as amines, quaternary ammonium compounds and iron salts, is only partially completed before the activity of the catalyst is spent, thus leaving a binder system with free epoxy and carboxyl groups.

Now, in accordance with the present invention, it has been found that propellant formulations having a binder system based on carboxy-terminated rubber can be rapidly cured with an all-epoxide curing agent to give useful solid propellants without the attendant disadvantages of the prior art curing systems, provided that the curing agent is a specific mixture of di- and trifunctional epoxides and that the curing is carried out in the presence of certain metal salts as catalyst.

Accordingly, the present invention relates to a solid propellant comprising solid oxidizer and a polymeric binder formed by reacting an uncured, carboxy-terminated rubber with, as the sole curing agent, a mixture of difunctional epoxides and trifunctional epoxides in the presence of a curing catalyst, which is a chromium salt of an aliphatic carboxylic acid containing 2 to 22 carbon atoms, chromium naphthenate or vanadium naphthenate, the ratio of epoxy groups in said mixture to carboxyl groups in the binder in substantially stoichiometric proportions, and the molar ratio of diepoxide to triepoxide in said mixture being from 15:1 to 1:1, and to a method for producing the cured propellant.

The carboxy-terminated rubber which is cured in accordance with the invention is an elastomeric polymer containing on the average not less than about 2 free carboxyl groups per polymer molecule and is preferably a homopolymer of an olefin such as isobutylene or a conjugated diene containing 4 to 8 carbon atoms, such as butadiene-1,3, isoprene, octadiene-1,3, and the like, a copolymer of more than 1 olefin or conjugated diene, such as an ethylene-propylene copolymer, a copolymer of a conjugated diene with other copolymerizable monomers which are preferably vinyl-substituted aromatic compounds such as styrene, the 1- or 2-vinyl naphthalenes and their alkyl, aryl, alkoxy, cycloalkyl, alkaryl, aralkyl, aryloxy, and dialkyl amino derivatives, or a mixture of any of the above homopolymers or copolymers.

The carboxy-terminated rubbers can be produced in known manner from the above monomers, as, for example, by carrying out the polymerization in the presence of, as initiators, organoalkali metal compounds of the formula $RM_2$, where R is an aliphatic, cycloaliphatic, or aromatic hydrocarbon radical, M is an alkali metal such as sodium, potassium, lithium, cesium, or rubidium, and $n$ is 2 to 4, and then replacing the alkali metal atoms on the ends of the polymer molecule with COOH groups by reacting with carbon dioxide and then hydrolyzing. Polymers containing 2 or more carboxyl groups per polymer molecule can be prepared by polymerizing an unsaturated carboxylic acid containing a single carbon to carbon double bond, such as acrylic, methacrylic, itaconic, vinyl acetic, oleic, fumaric, maleic, and like acids with itself or with a different copolymerizable monomer such as for example a different unsaturated acid, an olefin or a conjugated diene, according to any of the known methods.

The carboxy-terminated rubbers which are particularly useful in this invention are the carboxy-terminated polymers of butadiene and isobutylene, and have molecular weights ranging from about 1,000 to about 20,000, and preferably from about 3,000 to about 10,000.

The binder system of this invention is, as stated, the polymeric binder formed by curing in the presence of certain metal salts which are catalysts for the carboxyl-epoxide reaction the carboxy-terminated rubber with an all-epoxide curing agent which is a mixture of diepoxides and triepoxides having a diepoxide:triepoxide mole ratio of from about 15:1 to 1:1, and preferably from 8:1 to 3:1. Maintenance of the ratio of the difunctional epoxides to the trifunctional epoxides within the above ranges is important to the production of propellants having a satisfactory mechanical property balance since below the ratio of 1:1 the propellant elongation is low, and above the ratio of 15:1 the propellant tensile strength is low.

The diepoxides of the mixture contain two epoxide groups per molecule and are the saturated or unsaturated aliphatic, cycloaliphatic, aromatic or heterocyclic diepoxides which also contain, if desired, non-interfering substituents. Preferred diepoxides are the aliphatic diepoxides containing 4 to 30 carbon atoms, the cycloaliphatic diepoxides containing 12 to 40 carbon atoms and the diglycidyl ethers of dihydric phenols. Typical diepoxides include butadiene dioxide; 1,2,5,6-diepoxyhexane; diglycidyl ether; diglycidyl ether of 1,3-butanediol; 1,8-bis(2,3-epoxypropoxy) octane; 1,4-bis(2,3-epoxypropoxy) cyclohexane; 1,4-bis(3,4-epoxybutoxy)-2-chlorocyclohexane; the di(epoxycyclohexanecarboxylates) of aliphatic diols exemplified by the bis(3,4-epoxycyclohexanecarboxylate) of 1,5-pentanediol, 3-methyl-1,5-pentanediol, 2-methoxymethyl-2,4-dimethyl-1,5-pentanediol, ethylene glycol, 2,2-diethyl-1,3-propanediol, 1,6-hexanediol and 2-butene-1,4-diol; the oxyalkylene glycol epoxycyclohexanecarboxylates exemplified by bis(2-ethylhexyl-4,5-epoxycyclohexane-1,2-dicarboxylate) of dipropylene glycol, bis(3,4-epoxy-6-methylcyclohexanecarboxylate) of diethylene glycol and bis(3,4-epoxycyclohexanecarboxylate) of triethylene glycol; the epoxycyclohexylalkyl epoxycyclohexanecarboxylates exemplified by 3,4-epoxycyclohexylmethyl 3,4-epoxycyclohexanecarboxylate, 3,4-epoxy-1-methylcyclohexylmethyl 3,4-epoxy-1-methyl-cyclohexanecarboxylate, 3,4-epoxy-2-methylcyclohexylmethyl 3,4-epoxy-2-methylcyclohexanecarboxylate, 3,4-epoxy-6-methylcyclohexylmethyl 3,4-epoxy-6-methylcyclohexanecarboxylate, (1-chloro-3,4-epoxycyclohexan-1-yl) methyl 1-chloro-3,4-epoxycyclohexanecarboxylate, (1-bromo-3,4-epoxycyclohexan-1-yl) methyl 1-bromo-3,4-epoxycyclohexanecarboxylate and (1-chloro-2-methyl-4,5-epoxycyclohexan-1-yl) methyl 1-chloro-2-methyl-4,5-epoxycyclohexanecarboxylate; epoxycyclohexylalkyl dicarboxylates exemplified by bis(3,4-epoxycyclohexylmethyl) pimelate and oxalate and bis(3,4-epoxy-6-methylcyclohexylmethyl) maleate, succinate, sebacate and adipate; epoxycyclohexylalkyl phenylenedicarboxylates exemplified by bis(3,4-epoxycyclohexylmethyl) terephthalate and bis(3,4-epoxy-6-methylcyclohexylmethyl) terephthalate; bis(3,4-epoxy-6-methylcyclohexylmethyl) diethylene glycol ether; vinyl cyclohexene dioxide; diepoxide of dicyclohexene; dicyclopentadiene dioxide; bis(2,3-epoxycyclopentyl) ether; glycidyl 2,3-epoxycyclopentyl ether; 2,3-epoxycyclopentyl 2-methylglycidyl ether; 1,2,5,6-diepoxy-3-hexyne; 1,3bis(2,3-epoxypropoxy) benzene; 1,4-bis(2,3-epoxypropoxy) benzene; 1,3-bis(4,5-epoxypentoxy)-5-chlorobenzene; 4,4'-bis(2,3-epoxypropoxy) diphenylether; 2,2-bis(2,3-epoxypropoxyphenyl) methane; 2,2-bis[p-(2,3-epoxypropoxy) phenyl] propane, i.e., the diglycidyl ether of bisphenol A; quinoline diepoxide and the like, as well as mixtures thereof.

The triepoxides of the mixture contain three epoxide groups per molecule and are aliphatic, cycloaliphatic or aromatic triepoxides. Preferred triepoxides are the triepoxyalkanes containing 6 to 25 carbon atoms; the tri(epoxycyclohexane carboxylates) and the triglycidylethers of trihydric alcohols such as glycerol, 1,1,1-tri(hydroxymethyl) propane, 1,2,6-hexanetriol and the higher alcohols containing up to about 25 carbon atoms; and the triglycidyl ethers of trihydric phenols, such as phloroglucinol, the trihydroxydiphenyl methanes and propanes, the trihydroxyaminophenols, the trisphenols; and the like as well as mixtures thereof. Typical triepoxides include triepoxyhexane; triepoxydecane; 2,3,6,7,11,12-triepoxydodecane; 2,3,5,6-diepoxy-9-epoxyethyldodecane; tris(3,4-epoxycyclohexanecarboxylate) of 1,1,1-trimethylol propane; tris(3,4-epoxycyclohexanecarboxylate) of 1,2,3-propanetriol; 2,2[2,4,4'-tris(epoxypropoxy) diphenyl] propane; 1,1-bis(glycidyloxymethyl)-3,4-epoxycyclohexane; N,N,O-tris(epoxypropyl) p-aminophenol; and the like. Epoxide mixtures containing the diglycidylethers of biphenol A and the triepoxides of the aminophenols are particularly preferred.

For best results, both the diepoxide and the triepoxide of the mixture will be in the relatively pure state, i.e., having a purity of about 95 to 100 percent in order that all of the available carboxy groups of the rubber will be incorporated into the gel network without wastage of any appreciable number of polymer chains as dangling ends which do not contribute to the gel network.

The ratio of the epoxy groups in the epoxide mixture to the carboxyl groups of the rubber in the binder should be in substantially stoichiometric proportions. Although a slight excess of either is not harmful, it is preferred that a slight excess of epoxy groups over carboxyl groups be present in the binder.

The reaction of the carboxy-terminated rubber with the epoxide mixture requires the presence of a catalyst which promotes the carboxyl-epoxide reaction. Catalysts of this type must also have high activity in the presence of the other propellant ingredients, and must not adversely affect the desirable properties of the cured propellant, as by side reactions. The catalysts which have been found to fit all of the above requirements are chromium salts of aliphatic carboxylic acids containing 2 to 22 carbon atoms and preferably 2 to 18 carbon atoms, chromium naphthenate or vanadium naphthenate. The preferred catalysts include chromium acetate, chromium 2-ethylhexanoate, chromium neodecanoate, chromium stearate, chromium oleate, chromium naphthenate and vanadium naphthenate. The amount of catalyst necessary to promote the reaction will, of course, depend on many factors, as for example, on the particular salt employed, the binder materials and other propellant ingredients present, and the cure rate desired. In general, the amount utilized will vary from a very small catalytic amount up to about 0.1% of the propellant composition and preferably will be from about 0.005% to about 0.03 percent by weight of the composition.

The solid oxidizer component of the propellants of this invention is preferably an inorganic oxidizing salt, a number of which are well known to the art. Typical of such inorganic salts are the ammonium, alkali metal, or alkaline earth metal salts of nitric, perchloric, or chloric acids or mixtures thereof, and particularly such salts as ammonium perchlorate, sodium perchlorate, potassium perchlorate, magnesium perchlorate, lithium chlorate, strontium chlorate, potassium nitrate, sodium nitrate, calcium nitrate, ammonium nitrate, and the like. Other solid oxidizers such as cyclotetramethylene tetranitramine, cyclotrimethylene trinitramine, nitroguanidine, and the like can be substituted for all or part of the inorganic oxidizing salt, if desired.

In addition to the above-named ingredients, the propellant can also contain other additives such as metal fuels, plasticizers, and the various compounding ingredients commonly employed in making composite propellants, as for example, oxidation inhibitors, reinforcing agents, wetting agents, surfactants ballistic modifiers, radar attenuators, burning rate modifiers, and the like. In this connection, metal fuels such as powdered aluminum, beryllium, magnesium, zirconium or boron, alloys such as the aluminum alloys of boron, magnesium, manganese, copper, and the like, and plasticizers such as dioctyl phthalate, dioctyl azelate, dioctyl adipate, didecyl adipate, polybutadiene, polyisobutylene, and the like can be utilized. Certain well-known surfactants such as lecithin or mixtures of sorbitan monooleate and polyoxyethylene esters of mixed fatty and resin acids, ballistic modifiers such as di-n-butyl ferrocene, iron oxide, chromium oxide or oxamide, radar attenuators such as molybdenum trioxide, and the like can also be present in minor amounts within the scope of the invention.

The propellant formulations of this invention have, in general, the following composition range:

|  | Weight, % |
| --- | --- |
| Solid oxidizer | 60–95 |
| Metal fuel | 0–20 |
| Binder | 5–20 |
| Catalyst | 0.005–0.05 |

Preferably, the propellant compositions contain about 70 to about 90 weight percent solid oxidizer, about 5 to about 10 percent metal fuel, and from about 5 to about 20 weight percent binder. The binder includes the carboxy-terminated rubber, the epoxide mixture and the catalyst, as well as any plasticizer, if present. From about 40 to about 95 weight percent of the binder in the preferred formulation is the carboxy-terminated rubber, and from about 1 to about 10 weight percent is the epoxide mixture, while the plasticizer can be from 0 to about 50 weight percent, and preferably from about 20 to 40 percent by weight of the binder.

The propellant is prepared by intimately blending or mixing the ingredients using conventional techniques and standard equipment well known to those skilled in the art as suitable for the purpose. If desired, the addition of the catalyst to the mixture can be delayed until just prior to curing. The latter method offers the distinct advantage of giving a stable mixture which can be stored indefinitely up until the time it is needed.

The curing of the composition is conducted in the presence of the catalyst at any temperature, usually 0° to 150°C., the only effect of temperature variation being to increase or decrease the rate of reaction. It is preferred to carry out the cure at temperatures in the range of about 50° to 80°C. Within this range, the reaction rate is sufficiently rapid for economical production but not so high as to cause side reactions or to produce appreciable shrinkage and internal stresses.

The invention is further illustrated by the following examples in which parts and percentages are by weight unless otherwise specified. In these examples specific conditions and materials are presented as being typical and are not to be construed as limiting the invention.

EXAMPLES 1–6

A binder solution was first prepared by stirring 0.09 part of a chromium 2-ethylhexanoate containing 10.95 percent chromium or 0.15 part of a chromium 2-ethylhexanoate containing 10.45 percent chromium into a commercial carboxy-terminated polybutadiene having a molecular weight of about 5,000, specific gravity of 0.91 at 60/60°F., a viscosity of 300 poises at 77°F., and a carboxyl content of 0.032 to 0.036 equivalents per 100 grams of polybutadiene and containing 1.0 to 1.5 percent 2,2'-methylene-bis(4-methyl-6-tertbutyl) phenol as antioxidant, and then adding, with stirring after each addition, the desired amount of epoxide mixture and 16.0 parts dioctyl adipate and 15.9 parts of a random polymer of butadiene (containing a small amount of phenyl-$\beta$-naphthylamine as stabilizer) as plasticizers. In Examples 1–5, the epoxide mixture was a solution of the diglycidyl ether of bisphenol A (epoxy equivalency of 174 and 98 percent pure) and N,N,O-tris(epoxypropyl) p-aminophenol (epoxy equivalency of 97.4 and 96 percent pure) and in Example 6 the epoxide mixture was a solution of 3,4-epoxycyclohexylmethyl carboxyl-3,4-epoxycyclohexane (epoxy equivalency of 130.6 and 96 percent pure) and the same N,N,O-tris(epoxypropyl) p-aminophenol used in Examples 1–5.

The propellant formulations were prepared in a Baker Perkins vertical mixer (driven by an air motor and heated to 65°C by water) by mixing with the binder solution in the order given: powdered aluminum (average particle size of 10$\mu$), microatomized ammonium perchlorate (average particle size of 10$\mu$), unground ammonium perchlorate (average particle size of 200$\mu$), and spherical ammonium perchlorate (average particle size of 400$\mu$). After a total of 30 minutes' mixing at 40 p.s.i. air pressure, the resulting slurry was transferred to a wax-coated cardboard container (inside dimensions of length:width:height of 4:1.25:7) wherein it was deaerated in a vacuum dessicator at 75° to 80°C. under 1 mm. pressure for 30 minutes and then cured in a forced air oven at 80°C. The mechanical properties of the cured propellants were evaluated by subjecting dumbbells (1.9 inches effective gage length, ⅜ inch width, ¼ inch thick, and ½ inch radius) machined therefrom and then dried over silica gel for 3 days, to uniaxial constant strain rate tests at 0.7 in.-/min./in. strain rate and varying temperatures. Details of the compositions of these examples and the mechanical properties of the cured propellants are tabulated below in Table I and compared with controls A and B prepared, cured, and evaluated in the same manner as the examples except that in control A the epoxide solution was the diglycidyl ether of bisphenol A and did not contain any triepoxide, and in control B the epoxide solution was N,N,O-tris(epoxypropyl) p-aminophenol and did not contain any diepoxide.

Table I

|  | Ex. 1 | Ex. 2 | Ex. 3 | Ex. 4 | Ex. 5 | Ex. 6 | Control A | Control B |
|---|---|---|---|---|---|---|---|---|
| Propellant Composition (%) | | | | | | | | |
| Ammonium perchlorate | 83 | 78 | 81 | 83 | 83 | 83 | 83 | 83 |
| 10$\mu$ | 20 | 15 | 20 | 20 | 20 | 20 | 20 | 20 |
| 200$\mu$ | 32 | 32 | 30 | 32 | 32 | 32 | 32 | 32 |
| 400$\mu$ | 31 | 31 | 31 | 31 | 31 | 31 | 31 | 31 |
| Aluminum | 5 | 10 | 5 | 5 | 5 | 5 | 5 | 5 |
| Binder | 12 | 12 | 14 | 12 | 12 | 12 | 12 | 12 |
| Binder Composition (%)[1] | | | | | | | | |
| Carboxylated rubber | 64.31 | 64.31 | 64.31 | 64.43 | 64.23 | 65.08 | 64.41 | 65.77 |
| Epoxide | 3.69 | 3.69 | 3.69 | 3.57 | 3.77 | 2.92 | 3.59 | 2.23 |
| Diepoxide:triepoxide mole ratio | 5.3 | 5.3 | 5.3 | 5.3 | 7.3 | 3.6 | (all di) | (all tri) |
| Chromium salt | 0.09 | 0.09 | 0.09 | 0.15 | 0.09 | 0.09 | 0.15 | 0.09 |
| Ratio of Epoxide:Carboxyl equivalents | 1.07 | 1.07 | 1.07 | 1.04 | 1.07 | 1.07 | 1.00 | 1.03 |
| Cure time (days) | 6 | 7 | 9 | 9 | 9 | 6 | 9 | 9 |
| Properties | | | | | | | | |
| at 170°F. | | | | | | | | |
| modulus (p.s.i.) | 360 | 350 | — | 300 | — | 340 | — | — |
| tensile strength (p.s.i.) | 62 | 69 | — | 57 | — | 58 | — | — |
| elongation at 95% max. (%) | 32 | 33.5 | — | 33 | — | 35 | — | — |
| at 77°F. | | | | | | | | |
| modulus (p.s.i.) | 580 | 580 | 460 | 540 | 470 | 560 | 165 | 1300 |
| tensile strength (p.s.i.) | 108 | 109 | 93 | 102 | 88 | 91 | 36 | 115 |
| elongation at max. (%) | 36.5 | 38.5 | 43 | 35.5 | 39.5 | — | — | 12.5 |
| elongation at 95% max. (%) | 40 | 41.5 | 47 | 39.5 | 41.5 | 41.5 | 36 | 14.5 |
| at −70°F. | | | | | | | | |
| modulus (p.s.i. × 10$^{-2}$) | 55 | 68 | — | 54 | — | 68 | — | — |
| tensile strength (p.s.i.) | 437 | 480 | — | 381 | — | 452 | — | — |

Table I-continued

|  | Ex. 1 | Ex. 2 | Ex. 3 | Ex. 4 | Ex. 5 | Ex. 6 | Control A | Control B |
|---|---|---|---|---|---|---|---|---|
| elongation at 95% max. (%) | 20 | 18 | — | 20.5 | — | 15 | — | — |

(1)also contains plasticizers, as previously indicated

Comparison of the mechanical properties of the propellants of Examples 1–6 with those of controls A and B indicates that when the diepoxide alone is used as curing agent, the composition has a very low and unsatisfactory tensile strength and that when only the triepoxide is used as curing agent, elongation is poor.

EXAMPLE 7

Following the general procedure of Examples 1–6, a propellant composition was formulated by mixing 16 parts of a binder solution having an epoxide:carboxyl equivalency ratio of 1.05 and prepared from 59.31 parts of a carboxy-terminated polyisobutylene having a molecular weight of about 1,600, a viscosity of 394 poises at 55°C. and a carboxyl content of 0.11 equivalents per 100 grams of polyisobutylene, 0.09 part of chromium 2-ethylhexanoate (10.95 percent chromium), 10.69 parts of an epoxide mixture of the di- and triepoxides of Examples 1–5, the mixture having a diepoxide:triepoxide mole ratio of 3.3:1, 29.71 parts of a polyisobutylene (viscosity of 9 poises at 55°C.) plasticizer and 0.20 part of asolectin surfactant with 5 parts of powdered aluminum (average particle size of 10μ), 31.1 parts of micro-atomized ammonium perchlorate (10μ), 21.5 parts of unground ammonium perchlorate (200μ), and 26.4 parts of spherical ammonium perchlorate (400μ) and curing the composition at 80°C. for 9 days. Evaluation of the mechanical properties at 77°F. as in the above examples gave a modulus of 970 p.s.i., a tensile strength of 150 p.s.i., and an elongation at 95 percent of maximum stress of 28 percent.

EXAMPLES 8–10

Example 1 was repeated except that in these examples the mole ratio of diepoxide to triepoxide in the epoxide mixture was varied from 3.7 to 7.3 and the amount of carboxylated polybutadiene and epoxide mixture in the binder adjusted to total 68 percent of the binder at an epoxide:carboxyl equivalency ratio of 1.03-1.12. Details of these examples and the mechanical properties of the cured propellants are given below in Table II.

Table II

| | | | Mechanical Properties at 77°F. | | |
|---|---|---|---|---|---|
| Ex. No. | Epoxide: Carboxyl Equivalency Ratio | Diepoxide: Triepoxide Mole Ratio | Modulus (p.s.i.) | Tensile Strength (p.s.i.) | Elong. % (95% of max.) |
| 8 | 1.03 | 3.7 | 605 | 108 | 34.5 |
| 9 | 1.07 | 5.3 | 570 | 106 | 40 |
| 10 | 1.12 | 7.3 | 620 | 104 | 35.5 |

The propellant formulation of Example 9 was also cast into a steel motor having a case bond liner, cured as above and then fired in a 90-pound full scale motor. The firing was successful in all respects.

EXAMPLE 11

Example 1 was repeated except that in this example the binder composition contained 57.1 percent of the carboxylated polybutadiene of Example 1, 2.9 percent of the mixture of epoxides of Example 1 except that the diepoxide:triepoxide mole ratio was 3.3, 0.09 percent chromium 2-ethylhexanoate containing 10.95 percent chromium, 16 percent dioctyl adipate and 23.9 percent of a random polymer of butadiene [containing 1 percent 2,2'-methylene-bis(4-methyl-6-tert butyl) phenol as antioxidant], and the epoxide:carboxyl equivalency ratio was 1.00. Evaluation of the mechanical properties of the cured propellant at 77°F. gave a modulus of 520 p.s.i., a tensile strength of 101 p.s.i. and an elongation of 36 percent at 95 percent of maximum stress.

What we claim and desire to protect by letters patent is:

1. A solid propellant composition comprising a solid oxidizer and a polymeric binder formed by reacting an uncured carboxy-terminated rubber with, as sole curing agent, a mixture of difunctional epoxides and trifunctional epoxides wherein the diepoxide:triepoxide mole ratio in said mixture is 15:1 to 1:1, in the presence of a curing catalyst selected from the group consisting of a chromium salt of an aliphatic carbon acid containing 2 to 22 carbon atoms, chromium naphthenate and vanadium naphthenate, the ratio of epoxy groups in said mixture to carboxyl groups in said binder being in substantially stoichiometric proportions.

2. The composition of claim 1 wherein the diepoxide:triepoxide mole ratio of said mixture is 8:1 to 3:1 and the curing catalyst is chromium 2-ethylhexanoate.

3. The composition of claim 2 comprising by weight of the composition, about 60 to about 95 percent solid oxidizer, about 5 to about 20 percent polymeric binder and 0 to about 20 percent metal fuel, from 0 to about 50 percent by weight of the binder being plasticizer.

4. The composition of claim 3 comprising, by weight of the composition, about 70 to about 90 percent solid oxidizer, about 5 to about 20 percent polymeric binder and about 5 to about 10 percent metal fuel, from 20 to about 40 percent by weight of the binder being plasticizer.

5. The composition of claim 4 wherein the solid oxidizer is ammonium perchlorate, the polymeric binder is formed by reacting an uncured carboxy-terminated polybutadiene with as sole curing agent a mixture of the diglycidyl ether of bisphenol A and N,N,O-tris-(epoxypropyl)-p-aminophenol and the metal fuel is aluminum.

6. A method for preparing a solid propellant composition which comprises forming a blend of solid oxidizer, uncured carboxy-terminated rubber, and, as sole curing agent, a mixture of difunctional epoxides and trifunctional epoxides having a diepoxide:triepoxide mole ratio of 15:1 to 1:1, the ratio of epoxy groups in said mixture to carboxyl groups in said blend being in substantially stoichiometric proportions, and then curing the blend in the presence of a curing catalyst selected from the group consisting of a chromium salt of an aliphatic carboxylic acid containing 2 to 22 carbon atoms, chromium naphthenate and vanadium naphthenate.

* * * * *